Nov. 14, 1944. Z. LITTMAN 2,362,910
POWER TRANSMITTING MEANS
Filed Sept. 10, 1941
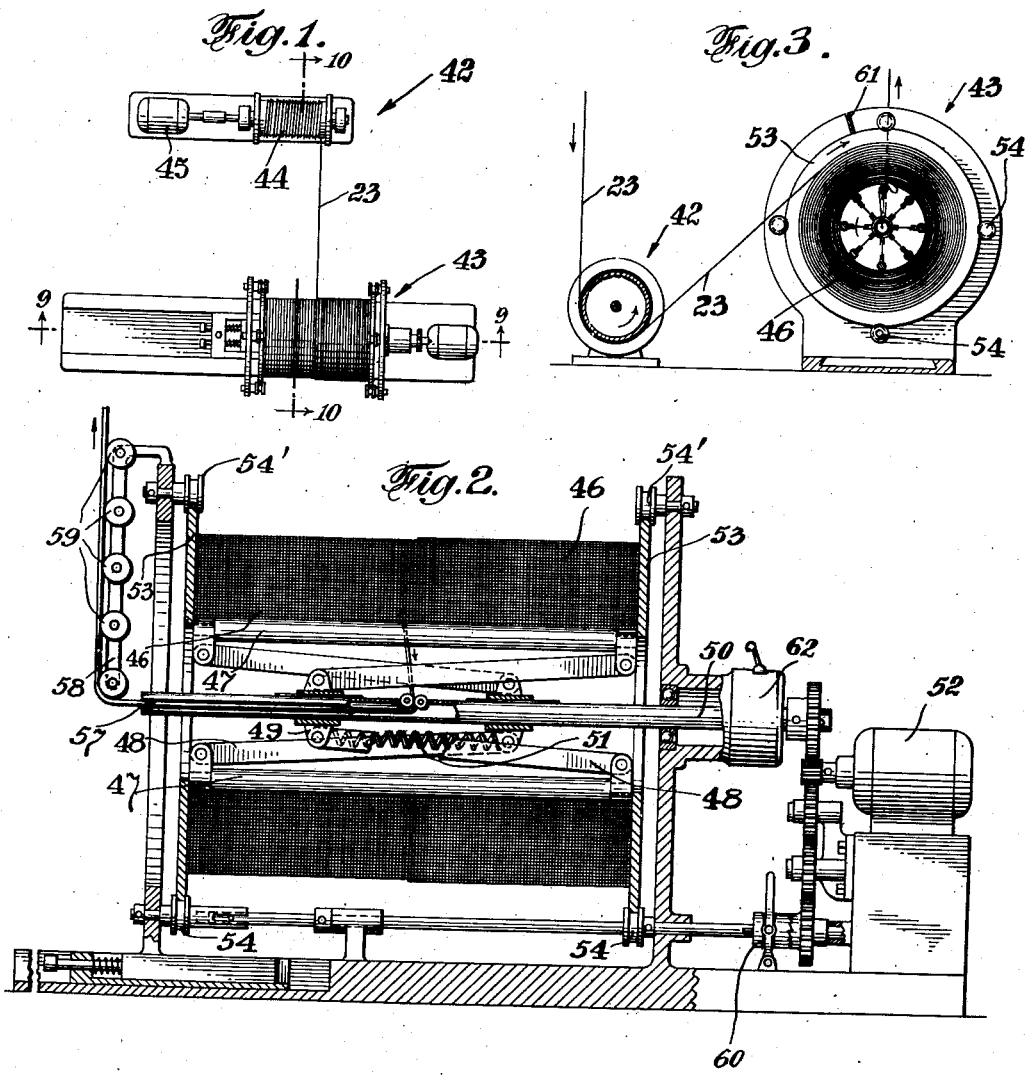
INVENTOR.
Zeno Littman Patented Nov. 14, 1944

2,362,910

UNITED STATES PATENT OFFICE 2,362,910

POWER TRANSMITTING MEANS

Zeno Littman, New York, N. Y.

Application September 10, 1941, Serial No. 410,321

15 Claims. (Cl. 254—176)

My present invention relates to power transmitting means, particularly to means transmitting motion impulses by means of cables, strings, cords, belts, or the like.

It is the main object of my present invention to provide means adapted to transmit by means of an endless cable or the like, motion impulses from a power source to a mechanism driven by this power source, while the distance between this driving power source and this driven mechanism is varying.

A further object of my present invention consists of winding-up and unwinding means for this endless driving cable, which means are adapted to wind up and unwind the driving cable at different speeds.

Still a further object of my invention consists of regulating means which make it possible to regulate the speed of winding-up and unwinding during the operation of the winding means.

Another object of my present invention consists of a combination of the above power transmitting means with railroad cars, ships, airplanes, and other transportation means.

With the above objects in view, my present invention mainly consists of power transmitting means comprising a winding-up and unwinding spool mechanism for a cable transmitting motion impulses, means for taking off one cable end from the inner surface of the cable coil wound upon the core of the spool mechanism, and separate means for winding-up the other cable end on the outer surface of this cable coil; this enables provision of separate means for regulating the speed of winding-up and unwinding this cable, thereby varying the length of the cable loop from the winding mechanism to the mechanism driven by this cable; this feature makes my new driving mechanism especially adapted for driving moving transportation means from a stationary power source.

I wish to note that the expression "cable" as used throughout this specification and claims, means all kinds of cable-like means adapted to transmit motion impulses, such as belts, cords, strings, or the like.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Fig. 1 is a plane view of the new winding-up and unwinding mechanism proposed by me;

Fig. 2 is a cross-section of one new winding-up and unwinding spool mechanism along line 9—9 of Fig. 1;

Fig. 3 is a cross-section of the new winding-up and unwinding mechanism shown in Fig. 1 along line 10—10;

Fig. 4 shows the winding-up and unwinding spool mechanism shown in Fig. 2, provided with the cylindrical tubing shown in Fig. 5; and Fig. 5 shows a cylindrical tubing used for pressing together the rollers of the core member of the spool mechanism shown in Fig. 2.

As shown in Fig. 1, the winding-up and unwinding mechanism mentioned above comprises a separate pulling mechanism 42 and at least one winding-up and unwinding spool mechanism 43. The pulling mechanism 42 serves for pulling the driving cable with the necessary speed, while the main purpose of the winding-up and unwinding spool mechanism consists in storing the pulled cable and in releasing the unpulled cable end at any speed required, independently from the speed of the pulled cable end. This makes it possible to regulate the length of the loop between the spool mechanism and the driven mechanism, and to control thereby the distance of this driven mechanism from the spool mechanism and the stationary power source with which this spool mechanism is associated.

The above mentioned pulling mechanism 42 consists of the drum 44 and the motor 45 rotating this drum. Cable 23 is wound several times about drum 44 and this pulled by this drum when required. The pulling speed may be regulated by controling the speed of motor 45.

Cable 23 is then wound up on the outer surface of the cable coil 46; this cable coil is supported by a core member comprising rollers 47 carried freely rotatably by levers 48. These levers are pivoted to members 49 arranged slidably on hollow shaft 50. The members 49 are constantly pressed against each other by the spring 51, thereby forcing the rollers 47 outwards into close contact with the inner surface of the cable coil 46. Shaft 50 is driven by motor 52 and rotates the entire core mechanism comprising levers 48 and rollers 47. During this rotation, each of the rollers 47 is performing an independent rotating movement along the inner surface of the cable coil 46.

The cable coil itself is rotated by means of the end walls 53 which are supported by the driving rollers 54 and the idling rollers 54'. These end walls 53 are entirely independent from the core mechanism and may be rotated at any required speed independently from the rotation of the core. Thus, it is also possible to stop by means of clutch 60 the movement of the cable coil 46, thereby also stopping the winding-up of cable 23 on the outer surface of coil 46, while continuing the winding-off of the cable from the inner coil surface.

The arrangement of this clutch 60 and of a change speed gear box 62 of well-known type for changing the speed of shaft 50 makes it possible to drive the end walls 53 determining the length of the wound-up cable, and the core mechanism determining the length of the unwound cable, at different and if required varying speed, and thereby not only to vary the speed of the driving cable but also to vary the length of the loop formed by this cable; furthermore, both these variations may be carried out simultaneously, i. e., the speed of the driving cable may be varied while the length of the loop formed by it changes. Thus it is possible to simultaneously increase or decrease the driving force while changing the distance of the driven mechanism from the stationary power source.

During operation, the cable 23 coming from drum 44 is wound about the outside of spool 46 of the winding-up and unwinding mechanism. In order to retain the rollers 47 of the core mechanism in their initial position while the inner layers of coil 46 are wound up, tubing 55 shown in Fig. 5 is inserted in the way shown in Fig. 4. Then, cable 23 is wound up about tubing 55; when the coil 46 is about three-quarters wound, tubing 55 can be removed. It should be noted that tubing 55 is provided with slot 56 in order to let pass the cable end taken off from the inner surface of coil 46. For inserting the cable into the spool mechanism, shaft 50 is provided with slot 57 and also one of the end walls 53 is provided with a slot 61. By means of these slots and the slot in tubing 55 it is possible to insert and remove the cable from the winding and spool mechanism in the required way.

It will be understood that each of the elements described above, or two or more together, may also find a useful application in other types of power transmitting means differing from the types described above.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim as new and desire to secure by Letters Patent is:

1. Means for driving a power transmitting endless cable forming a driving cable loop comprising in combination a cable core on which said driving cable is partly wound up in the form of a cable coil having an inner and an outer cylindrical coil surface, means combined with said core for unwinding one cable end of said driving cable loop from said inner cylindrical coil surface and means combined with said cable coil for winding up the other cable end of said driving cable loop on said outer cylindrical coil surface.

2. Means for driving a power transmitting endless cable forming a driving cable loop comprising in combination a cable core on which said driving cable is partly wound up in the form of a cable coil having an inner and an outer cylindrical coil surface, means combined with said core for unwinding one cable end of said driving cable loop from said inner cylindrical coil surface, and means for rotating said cable coil, thereby enabling winding up of the other cable end of said driving cable loop on said outer cylindrical coil surface.

3. Means for driving a power transmitting endless cable forming a driving cable loop comprising in combination a cable core on which said driving cable is partly wound up in the form of a cable coil having an inner and an outer cylindrical coil surface, means combined with said core for rotating the same independently from said cable coil wound up on it, and means combined with said cable coil for winding up the other cable end of said driving cable loop on said outer cylindrical coil surface.

4. Means for driving a power transmitting endless cable forming a driving cable loop comprising in combination a cable core on which said driving cable is partly wound up in the form of a cable coil having an inner and an outer cylindrical coil surface, means combined with said core for rotating the same independently from said cable coil wound up on it, and means for rotating said cable coil, thereby enabling winding up of the other cable end of said driving cable loop on said outer cylindrical coil surface.

5. Means for driving a power transmitting endless cable forming a driving cable loop comprising in combination a cable core on which said driving cable is partly wound up in the form of a cable coil having an inner and an outer cylindrical coil surface, means combined with said core for unwinding one cable end of said driving cable loop from said inner cylindrical coil surface, guiding means for the unwound cable end of said cable loop arranged inside said core for guiding said cable end out of said core while the same is rotating, and means combined with said cable coil for winding up the other cable end of said driving cable loop on said outer cylindrical coil surface.

6. Means for driving a power transmitting endless cable forming a driving cable loop comprising in combination a cable core on which said driving cable is partly wound up in the form of a cable coil having an inner and an outer cylindrical coil surface, means combined with said core for rotating the same independently from said cable coil wound up on it, thereby unwinding one cable end of said cable loop from the inner surface of said cable coil, guiding means for said unwound cable end arranged inside said core for guiding said cable end out of said core while the same is rotating, and means combined with said cable coil for winding up the other cable end of said driving cable loop on said outer cylindrical coil surface.

7. Means for driving a power transmitting endless cable forming a driving cable loop comprising in combination a cable core on which said driving cable is partly wound up in the form of a cable coil having an inner and an outer cylindrical coil surface, means combined with said core for rotating the same independently from said cable coil wound up on it, thereby unwinding one cable end of said cable loop from the inner surface of said cable coil, guiding means for said unwound cable end arranged inside said core for guiding said cable end out of said core while the same is rotating, and means for rotating said cable coil independently from said cable core, thereby enabling winding up of the other cable end of said driving cable loop on said outer cylindrical coil surface.

8. Means for driving a power transmitting endless cable forming a driving cable loop comprising in combination a cable core on which said driving cable is partly wound up in the form of a cable coil having an inner and an outer cylindrical coil surface, means combined with said core for rotating the same independently from said cable coil wound up on it, thereby unwinding one end of said cable loop from said inner coil surface, and means comprising two wall members for rotating said cable coil independently from said core, thereby winding up the other end of said cable loop on said outer cylindrical coil surface.

9. Means for driving a power transmitting endless cable forming a driving cable loop comprising in combination a cable core on which said driving cable is partly wound up in the form of a cable coil having an inner and an outer cylindrical coil surface, means combined with said core for unwinding one cable end of said driving cable loop from said inner cylindrical coil surface, guiding means for the unwound cable end of said cable loop arranged inside said core for guiding said cable end out of said core while the same is rotating, and means comprising two wall members for rotating said cable coil independently from said core, thereby winding up the other end of said cable loop on said outer cylindrical coil surface.

10. Means for driving a power transmitting endless cable forming a driving cable loop comprising in combination a cable core on which said driving cable is partly wound up in the form of a cable coil having an inner and an outer cylindrical coil surface, said core being composed of a series of freely rotatably arranged parallel rollers adapted to press against said inner cylindrical coil surface, thus supporting said coil, means combined with said core for guiding one cable end of said driving cable loop from said inner cylindrical coil surface, end walls arranged at the ends of said cylindrical coil co-axially with the same and being adapted to rotate said cable coil independently from the rotation of said cable core, thereby winding up the other cable end of said driving cable loop on said outer cylindrical coil surface, and driving means combined with said cable core and said end walls for rotating said core and said end walls at different speeds independently from each other.

11. In a power transmitting device, an endless cable forming a driving cable loop, means for pulling a portion of said cable loop, a winding up and unwinding storage spool mechanism for winding up said pulled portion of said loop and unwinding another portion of said loop, said winding-up and unwinding storage spool mechanism including means for varying the relative speed of winding up said pulled portion and unwinding the said another portion of said loop, whereby winding up and unwinding can be carried out at different relative speeds so that the length of said driving cable loop may be varied by said means for varying the relative speed of winding up and unwinding during operation of said power transmitting device.

12. In combination with the winding-up and unwinding mechanism claimed in claim 10, a hollow shaft for said core for taking off the cable unwinding from the inner surface of the cable coil.

13. In combination with the winding-up and unwinding mechanism claimed in claim 10, spring members for pressing the cylindrical rollers forming the core member of the mechanism against the inner surface of the cable coil wound about said core rollers.

14. In combination with the winding-up and unwinding mechanism claimed in claim 10, a cylindrical tubing about the rollers of the core member in order to press them together.

15. In a winding-up and unwinding mechanism of the type claimed in claim 10, said core member and one end wall having slots for inserting and removing the cable.

ZENO LITTMAN.